United States Patent
Guyer, Jr. et al.

[15] 3,677,446
[45] July 18, 1972

[54] LIQUID GUN FOR USE ON WHEELED VEHICLE

[72] Inventors: Reynolds W. Guyer, Jr., Mendota Heights; Norton M. Cross, Jr., White Bear Lake; Barbara Allen Griggs, St. Paul; Martin A. Lundquist, Plymouth, all of Minn.

[73] Assignee: Reynolds W. Guyer, Jr., Winsor Concepts, Minneapolis, Minn.

[22] Filed: Aug. 4, 1969

[21] Appl. No.: 847,034

[52] U.S. Cl.................................................222/177, 46/175
[51] Int. Cl..............................................................B05b 9/06
[58] Field of Search................222/79, 177; 239/157; 46/175

[56] References Cited

UNITED STATES PATENTS

| | | | |
|---|---|---|---|
| 2,703,256 | 3/1955 | Mascaro | 239/157 X |
| 2,721,437 | 10/1955 | Greenlund | 239/157 X |
| 3,534,533 | 10/1970 | Luoma | 239/157 X |
| 1,387,352 | 8/1921 | Clark | 239/157 |
| 2,728,492 | 12/1955 | Fox | 222/177 |
| 3,142,200 | 7/1964 | Stillman et al. | 222/79 X |
| 3,365,838 | 1/1968 | Butler et al. | 222/79 X |

*Primary Examiner*—Robert B. Reeves
*Assistant Examiner*—Franics J. Bartuska
*Attorney*—Frederick E. Lange, John J. Held, Jr. and Eugene J. Johnson

[57] ABSTRACT

A water gun for use on a bicycle or tricycle vehicle in which a pump driven by a roller engageable with a wheel of the vehicle drives a pump to pump water from a container through a nozzle. A cable controlled by a handle secured to the handle bar of the vehicle is used to move the roller into engagement with the wheel when it is desired to squirt water. A clacker may also be actuated by the roller to produce a sound simulating that of a machine gun.

7 Claims, 3 Drawing Figures

Patented July 18, 1972 3,677,446

INVENTORS
REYNOLDS W. GUYER, JR.,
NORTON M. CROSS, JR.,
BARBARA ALLEN GRIGGS,
MARTIN A. LUNDQUIST
BY Frederick E. Lange
ATTORNEY Patented July 18, 1972

INVENTORS
REYNOLDS W. GUYER, JR.,
NORTON M. CROSS, JR.,
BARBARA ALLEN GRIGGS,
MARTIN A. LUNDQUIST
BY
ATTORNEY

LIQUID GUN FOR USE ON WHEELED VEHICLE

BACKGROUND OF THE INVENTION

The present invention is concerned with a liquid gun adapted to mount on a wheeled vehicle, such as a bicycle or tricycle. It has been proposed to provide a water gun to form part of the grip of a bicycle, this water gun being actuated by pressing a trigger. When the trigger is pressed, a predetermined amount of water is discharged through the nozzle. This prior type of arrangement has several drawbacks. In the first place, the operation of the unit over any extended period of time requires repeated actuation of the trigger. Moreover, the device lacks appeal since it is essentially an ordinary water squirt gun mounted on the handle bar of the vehicle.

SUMMARY OF THE PRESENT INVENTION

The present invention is concerned with a liquid gun for use with such a wheeled vehicle in which the gun is operated by a separate motor means which is manually controlled rather than manually actuated. Thus, the gun can be used to deliver liquid, either continuously or intermittently, as long as the manual control is held in its operating position, as long as the vehicle is being operated, and as long as there is a supply of liquid available.

Basically, we accomplish this by providing a pump which has an actuator including a rotatable member designed to be operatively coupled with one of the wheels of the vehicle with means for securing a liquid container, a nozzle, a pump and the actuator to such a wheeled vehicle with the rotatable member in a position in which it can be operatively coupled with one of the wheels of the vehicle and with a nozzle directed in the desired direction for propulsion of a stream of liquid, there being means for selectively moving the rotatable member into and out of the position in which it is operatively connected with a wheel of the vehicle when the apparatus is mounted on the vehicle.

More specifically, the rotatable member is in the form of a roller designed to engage one of the wheels of the vehicle. The means for selectively moving the rotatable member into and out of a position in which it is operatively connected with the vehicle includes a manually operable control designed to be secured to the handle bar of the vehicle. This manually operable control is connected by a flexible cable to the means for moving the rotatable member. The liquid container, the pump and the actuator may be supported as a single unit on a common support member designed to be secured to such a wheeled vehicle. This common support member may be designed to be secured to a fork member supporting the front wheel of the vehicle with the roller in proximity to the front wheel of the vehicle when the gun is so mounted. The nozzle may be formed as part of the single unit. Alternatively, the nozzle may be separated from the pump and housing unit and mounted on a portion of the vehicle which does not turn with the wheel so that the nozzle is always directed in the direction of movement of the vehicle rather than in the direction in which the wheel is pointing.

The rotatable member may have associated therewith a resilient member which is periodically engaged by the rotatable member when the latter is operatively coupled with the wheel, this resilient member being effective to produce an intermittent sound simulating the sound of an automatic repeating gun. This sound may be synchronized with the delivery of intermittent streams of liquid. The pump may have a reciprocating plunger for operating the same and there may be a link pivoted to the plunger and eccentrically secured to the rotatable member to cause reciprocation of the plunger when the rotatable member is rotating.

Other features and objects of the invention will be apparent from a consideration of the accompanying specification, claims and drawing.

DESCRIPTION OF THE PREFERRED EMBODIMENT

Figure 1:
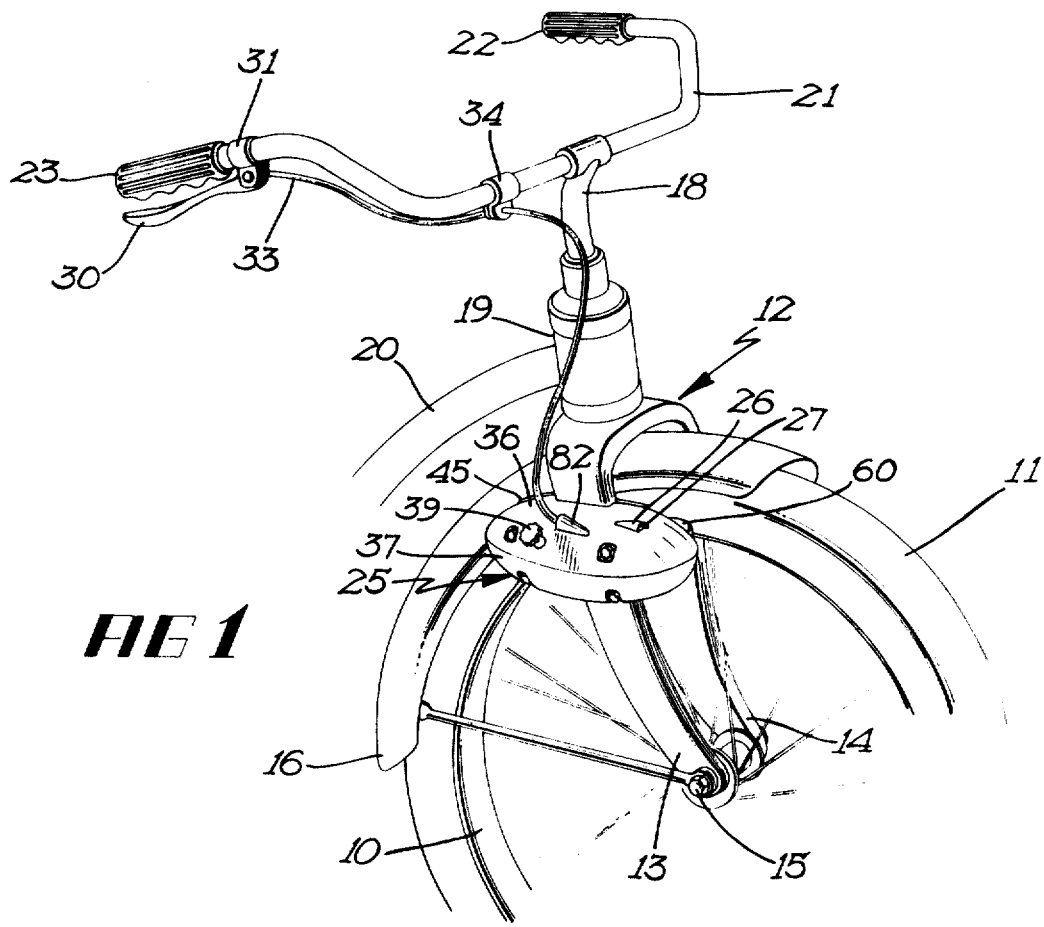
FIG. 1 is a fragmentary view of a tricycle with the gun of our invention mounted thereon.

Referring to FIG. 1, we have shown the front portion of a tricycle having a wheel 10 on which is mounted a tire 11. The wheel 10 is journalled on an axis supported by a front fork member 12 having two legs 13 and 14 which straddle the wheel 10 and support the axle 15. Supported on the underside of the cross portion of fork member 12 is a conventional mud guard 16. The fork 12 has a steering bar 18 secured thereto, this steering bar extending through and being suitably journalled in a cylindrical housing 19 rigidly secured to a frame member 20. Fastened in a conventional manner to the steering bar 18 is a handle bar 21 which terminates in two gripping portions 22 and 23. The apparatus which has been described so far is common to many tricycles and is shown merely to illustrate the mechanism with which our gun is designed to cooperate.

Referring now to the gun of the present invention, there is a single housing 25 which may be formed by a suitable molding process. In order to facilitate molding, the housing may be formed of several sections which are separately molded and held together in any suitable watertight manner. Secured to the upper portion of the housing 25 is a nozzle housing 26 through which projects a nozzle 27 which, as is evident from the drawing, is tubular in form.

As previously indicated, the gun has a rotatable member which is designed to be operatively coupled with one of the wheels of the vehicle. This rotatable member is moved into and out of a position in which it is coupled with the vehicle by means of a hand operated actuator 30 pivotally secured to a clamp secured to the handle bar 21 adjacent one of the grips 22 and 23. The hand operated actuator 30 is preferably closely adjacent one of the grips 22 and 23 so that the rider of the vehicle can readily actuate the same without removing his hand from the grip. The actuator 30 is operatively connected through a lever mechanism with a cable located in a cable housing 33 which is secured by a clamp 34 to the handle bar 21. The cable housing 33 as is evident from FIG. 1 and as will be described in connection with FIG. 2 extends into the main housing 25 of the gun.

Figure 2:
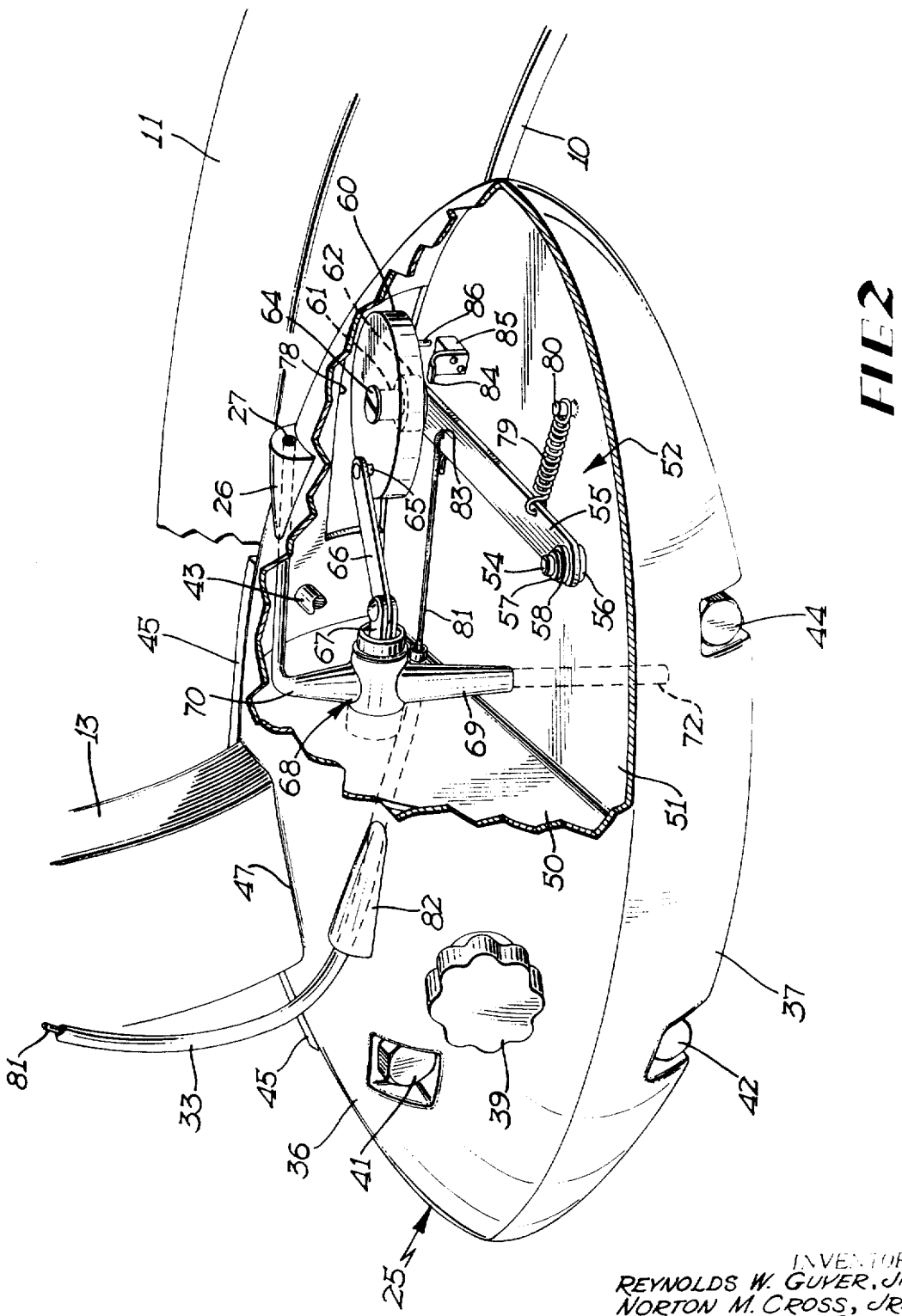
FIG. 2 is a view partly in section showing the manner in which the moving parts of the gun are interrelated.

Reference will now be made to FIG. 2 to show the manner in which the various moving parts cooperate. The housing 25, as will be noted from FIGS. 1 and 2, is curved, the bottom portion being basically the shape of a boat, being closed with a top member 36 which is sealed to the bottom 37 of the container to form a closed watertight chamber. A closure member 39 is screw threadedly secured in an opening in the cover portion 36, which opening acts as a filler opening. The closure member 39 when tightened up acts to seal against any escape of liquid out of the filler opening. A plurality of bolts 41, 42, 43 and 44 extend through the housing and engage with a strap 45 disposed on the opposite side of fork member 13. It will be noted that the inner wall of housing 25 is curved as indicated at 47 to conform with the curvature of the fork member. The bolts 41, 42, 43 and 44 when engaged with the nuts on the opposite sides of strap member and when the nuts are suitably tightened, serves to hold the housing 25 firmly in position on the fork member 13. The housing 25 is preferably provided with suitable recessed portions into which the heads of bolts 41, 42, 43 and 44 fit so that these heads do not project beyond the surface of the housing. Otherwise, there is a danger that they might catch on clothing and tear the same. It is also to be understood that suitable means are provided to insure that liquid cannot escape around the points through which bolts 41, 42, 43 and 44 extend through the housing. This may be accomplished in any of several manners. For example, the stems of the bolts may pass through tubular members which extend through the housing and are sealed at both ends thereto in a fluid-tight manner. Or, suitable gaskets may be employed which provide a watertight seal between the bolts and the walls through which they pass. Such expedients are well known in the art and need not be described in further detail. Disposed transversely across an intermediate portion of the housing 25 is a vertical bulkhead wall 50 sealed in a watertight manner to the outer walls of the housing 25 and to a horizontal floor member 51 which likewise extends transversely across the housing 25 and is sealed to the outer walls of the housing. The vertical bulkhead wall 50 and the horizontal floor member 51 form with the outer walls of the housing 25 a chamber which is isolated in a fluid-tight manner from the rest of the housing so that this chamber can be exposed to the atmosphere and will not permit the escape of water within the main portion of container 25. Both members 50 and 51 are preferably formed of molded material of the same material as that of which housing 25 is formed.

Extending upwardly from the floor member 51 of the auxiliary housing 52 is a stud 54 which can be molded integrally with the floor 51. A lever 55 has an aperture therethrough of a size substantially forming with the exterior diameter of the stud 54, this aperture fitting over the stud 54 so that the lever 55 is pivotally supported by the stud 54. Preferably, a washer 56 is interposed between the lever 55 and the wall 51 to hold the lever 55 in a raised position off of the floor 51. The lever 55 is held in position on the stud 54 by a snap ring 57 which snaps into a groove near the upper end of stud 54. Preferably a second washer 58 is interposed between the snap ring 57 and the upper surface of lever 55. The lever 55 is thus supported for pivotal movement in a plane parallel to the floor member 51.

The lever 55 pivotally supports a roller 60 which is journalled for rotation about a pin 61 by the outer portion of lever 55 and extending upwardly therefrom. A spacer washer 62 is preferably interposed between the lever 55 and the roller 60 and acts as a bearing to facilitate rotation of the same. If desired, the washer 62 may be provided with surfaces of bearing material to minimize the friction resulting as roller 60 is rotated. The upper end of the stud 61 is provided with any suitable fastening means 64. For example, the stud 61 may be provided with a tapped threaded opening and the fastening means 64 may take the form of a screw which is threadedly engaged with this tapped opening and serves to retain the roller in position on the stud 61.

The roller 60 is provided with a molded integral stud 65 which is pivotally connected to a link 66 which is pivotally connected to the stud in any suitable manner. The link 66, in turn, is pivotally connected to and disposed between the two arms of a yoke member 67 of a reciprocating plunger of a pump generally indicated by reference numeral 68. Since the details of the pump are not material to the invention, they have not been shown. Generally, it is very old in the art to provide pumps which are operated by reciprocating plungers. The pump has an inlet portion 69 and an outlet portion 70. The inlet portion 69 has a tube 72 secured thereto which extends through and is sealed to the floor 51 of the compartment 52. The outlet portion 70 extends through the upper wall of the housing 25 and is centrally disposed within the projecting curved hollow portion 26 of the casing. The outlet portion 70 terminates in the tubular nozzle portion 27 centrally disposed with respect to the opening of the projecting portion 26 of housing 25, the nozzle 27 being directed forwardly and generally parallel of the longitudinal axis of the casing 25.

The roller 60 extends through an elongated opening 78 in the inner wall of the casing 25. The extent to which the roller 60 projects outwardly through opening 78 depends upon the position of the lever 55. The lever 55 is biased to the position shown by a spring 79 which is secured to the lever 55 and is anchored to a post 80. When lever 55 is in the position shown, the roller 60 is in a position such that when the pump is attached to a bicycle or tricycle, the roller 60 is out of engagement with the wheel. If, however, the lever 55 is moved in a counterclockwise direction (as viewed in FIG. 2), the position of wheel 60 is shifted so that it moves outwardly through the opening 78 so as to project further away from the casing 25. This brings it into engagement with the tire 11 so that as the wheel 10 is rotated, the roller 60 is likewise rotated. Roller 60 may preferably be of a plastic material which tends to frictionally engage the tire so that there is no slippage between the tire and the roller.

The movement of lever 55 away from the position to which it is biased by spring 79 is controlled by the cable in cable housing 33. The cable housing 33 has an inner cable 81 which extends through the housing 33. At its outer end, the cable 81 is attached to a lever actuated by actuator 30 so that upon actuator 30 being drawn upwardly towards the grip 23, the cable 81 is pulled outwardly. The cable housing 33 enters the main casing 25 through a projecting portion 82. The cable housing passes through the portion of casing 25 containing the liquid and through the vertical bulkhead wall 50. Both at the point where the cable housing 33 enters the casing 25 in the projecting portion 82 and the point at which it passes through the bulkhead wall 50, it is sealed in a watertight manner to the member through which it passes. The cable housing 33 is also formed of or coated with waterproof material so that the cable housing may be exposed to the water or other liquid in casing 25 without damage thereto. The innermost end of cable 81 is passed through an opening 83 in the lever 51 and is hooked to the lever 51. It will be obvious that upon handle member 30 being drawn upwardly towards the grip 23, the cable 81 will be drawn outwardly and will exert a force on lever 55 tending to rotate it in a counterclockwise direction against the biasing action of spring 79. This results in the lever 55 being rotated and in the roller 60 being shifted to a position in which it projects further out through the opening 78 and, as previously explained, engages the tire 11. When this happens and the bicycle or tricycle is being propelled, the roller 60 will rotate at a speed dependent upon the speed of movement of the vehicle. The stud 65, being eccentrically mounted, will cause reciprocation of the link 66 to in turn cause reciprocation of the plunger 67 of pump 68. This will result in a stream of liquid being drawn up through inlet tube 62 and pumped out through the nozzle 74. Each time that the plunger 67 moves inwardly, water moves out of the nozzle 74. Where a reciprocating pump is used, as shown, the stream of water will temporarily stop while the plunger 67 is being moved outwardly to draw in a fresh supply through tube 72 and inlet portion 69. The result is that there will be a series of intermittent streams. In other words, there will be a series of spurts of water. This is normally a desirable effect in that it produces an effect simulating a series of bullets being emitted from a machine gun. Where, on the other hand, it is desired to have a continuous stream of water, all that it is necessary to do is to have a rotary pump driven by the roller 60 through a suitable driving connection. Regardless of whether the delivery of water is intermittent or continuous, the delivery will continue as long as the hand actuated member 30 is being gripped. Thus, it is possible to project the liquid, either intermittently or continuously, for a substantial period of time.

To further enhance the gun effect, we also provide a device for producing a sound simulating that of an automatic repeating gun. We provide a leaf spring 84 which is secured to a block 85 and which is adapted to be engaged by a downwardly extending stud 86 secured to the roller 60. When the roller 60 is engaged with a tire, the roller 60 rotates in a clockwise direction. When this happens, the pin 86 will periodically engage the leaf spring 84, riding up over the top thereof after flexing the same. When the leaf spring is released, it will produce a clicking sound. Thus, each time that the roller makes one revolution, the spring 84 will be compressed and released. Since the diameter of the roller is much smaller than that of the tire, it will make a number of revolutions for each revolution of the wheel. Thus, the clicking sound will be of a relatively high frequency and will thus simulate the noise of a rapidly operating automatic repeating gun. The location of the pin 86 with reference to the leaf spring 84 is preferably so selected with respect to the length of the delivery tube from the gun 68 to the nozzle 27 that the click occurs at the time that delivery of the stream of liquid is taking place. Thus, each time that a stream of liquid is ejected from the nozzle 27, there will be an audible click. This further adds to the effect simulating that of an automatic repeating gun.

The leaf spring 84 is preferably of a width such that regardless of whether the roller 60 is in the retracted position shown or the advanced position resulting when the handle operated actuator 30 is compressed, the pin will always lie in the path of the leaf spring 84. Otherwise, the roller might have ceased its operation when the pin 86 was opposite the edge of the spring 84 and this might prevent the return of the lever 55 to the position shown.

MODIFICATION OF FIG. 3

Figure 3:
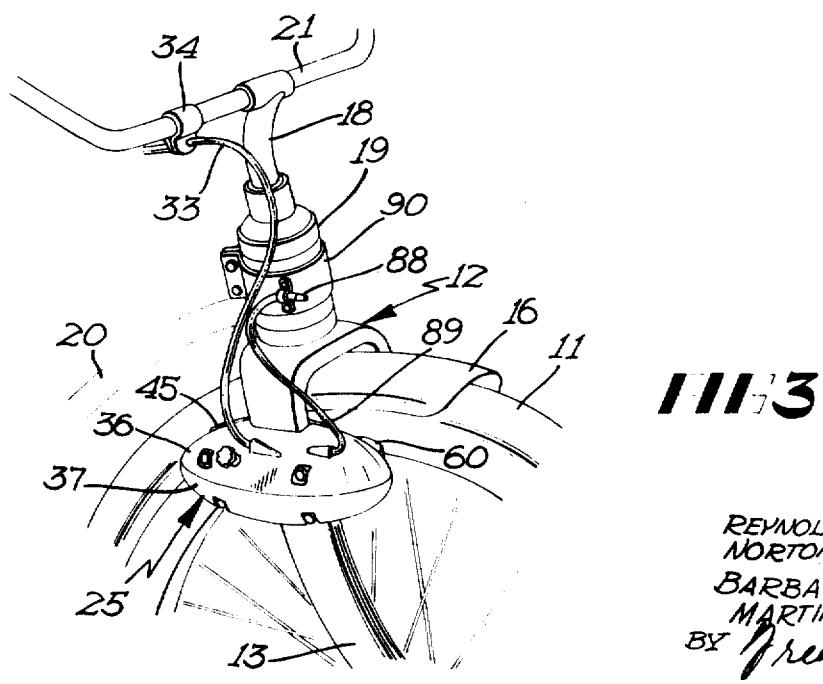
FIG. 3 is a fragmentary view of a tricycle having mounted thereon a modification of our gun in which the nozzle is separately located from the other elements of the gun.

In FIG. 3, there is shown a modification in which the nozzle always remains pointed in the direction of travel of the bicycle rather than in the direction in which the front wheel is pointed. It will be appreciated that with the apparatus of FIGS. 1 and 2, the housing 25, being clamped to the fork 13, turns with the wheel. Since the outlet nozzle 27 is aligned with the longitudinal axis of housing 25, it will be obvious that the nozzle 27 is likewise always directed in the direction of travel of the wheel. In some cases, it may be considered desirable to have the stream directed in the travel of the bicycle rather than in the direction in which the wheel is pointed.

In the arrangement of FIG. 3, a separate nozzle member 88 is secured to the end of an auxiliary tube 89 which is secured over the original nozzle member 27 of FIGS. 1 and 2. The tube 89 and the nozzle 88 are held in position on the cylindrical housing 19 by a suitable clamping band 90 which may be detachably secured to the cylindrical housing 19, which, as was previously pointed out, is rigidly secured to the frame member 20. In this modification, the liquid coming out of the nozzle 27 is directed through the hose 89 and out through the auxiliary nozzle 88. As the wheel turns, the housing 25 turns but the nozzle 88 always remains directed in the same direction as that in which the bicycle or tricycle is moving. The relative motion between the stud member 13 and the cylindrical housing 19 is absorbed by the hose 89 which is relatively flexible.

With both the modifications of FIGS. 1 and 2 and that of FIG. 3, the gun of the present invention permits a series of streams of water to be projected for a great distance as long as the grip 30 is depressed against the handle grip 23. This action continues as long as the vehicle is moving and as long as water is in the housing 25. The housing 25 is of sufficient size as to hold a large quantity of water or other liquid. At any time when the supply of liquid becomes relatively low, all that it is necessary to do is to remove the closure 39 and to refill the container. It will be seen that we have provided a gun suitable for use with a tricycle or bicycle in which the rider can, whenever the vehicle is moving, project a series of streams of liquid. Whenever it is desired to terminate the delivery of liquid, all that it is necessary to do is to release the handle operated actuator. While the liquid is being delivered, a rapidly repeating noise is produced, synchronously with the delivery of the liquid, to simulate the noise of an automatically repeating gun. Due to the fact that the delivery of the streams of water is intermittent in the embodiments shown and to the fact that each stream of water is accompanied by an audible sound, the gun has a very definite appeal to the operator. Unlike prior art devices in which the operation of the gun is entirely manual, the present device has the attraction of being power operated under the control of the operator.

While we have shown certain specific embodiments of our invention, it is to be understood that these are for purposes of illustration only.

We claim as our invention:

1. A liquid toy gun for use on a wheeled passenger vehicle having a frame and a single front wheel journalled in a fork rotatably secured to said frame and rotatable about an axis substantially perpendicular to the axis of movement of the vehicle, said fork having a handle bar operatively connected thereto for rotative adjustment of the fork and the direction of travel of the front wheel, said liquid toy gun comprising;

a housing having clamping means for detachably securing the same to one leg of such a fork; said housing enclosing a liquid-tight container for liquid, a pump having an inlet connected to said container and an outlet through which said pump forces liquid pumped from said container, and an actuator for said pump including a rotatable member extending out of the housing and designed to be operatively coupled with the front wheel of the vehicle, said actuator being so positioned with respect to said housing that when said housing is properly secured to one leg of the fork of such a vehicle, said rotatable member is in a position in which it can be operatively coupled with the front wheel of the vehicle regardless of the position of the front wheel with respect to the vehicle, means for selectively moving said rotatable member into and out of a position in which it is operatively coupled to the front wheel of the vehicle when said housing is mounted on the fork of such a wheeled vehicle, and a tubular nozzle member connected to said outlet for direction of the liquid generally forwardly of the vehicle.

2. The gun of claim 1 in which the means for selectively moving said rotatable member into and out of a position in which it is operatively coupled with the front wheel of a vehicle includes means for biasing said rotatable member out of the position in which it is coupled with the front wheel of the vehicle, a manually operable control designed to be secured to the handle bar of the vehicle for moving the rotatable member into such position against the action of the biasing means.

3. The gun of claim 2 in which a cable extends between said manually operable control and said means for moving said rotatable member.

4. The gun of claim 1 in which said nozzle is supported by and projects out of said housing.

5. The gun of claim 1 in which said nozzle is remote from said housing and is adapted to be secured to a portion of the vehicle which does not turn with turning of the front wheel so as always to be directed in the same direction regardless of the direction in which said front wheel is disposed.

6. The gun of claim 1 in which the pump has a reciprocating plunger which forces liquid out of said nozzle only when said plunger is moved in one direction so that as said rotatable member is rotated the liquid is projected from said nozzle in a series of intermittent streams.

7. The gun of claim 6, in which said rotatable member has associated therewith a resilient member which is periodically engaged by said rotatable member synchronously with the ejection of liquid from said nozzle while said rotatable member is operatively coupled with a wheel, said resilient member being effective to produce a sound each time that a stream of liquid is ejected from said nozzle, so as to simulate the a action of an automatic repeating gun.

* * * * *